United States Patent [19]

Stewart, Jr. et al.

[11] 3,770,461

[45] Nov. 6, 1973

[54] PREPARATION OF A FRUIT PUDDING

[75] Inventors: Aubrey P. Stewart, Jr.; Clarence R. Dreier, Jr., both of Corning, Iowa

[73] Assignee: Allied Chemical Corporation, New York, N.Y.

[22] Filed: Aug. 27, 1971

[21] Appl. No.: 175,741

[52] U.S. Cl. .................................. 426/380, 426/399
[51] Int. Cl. .................................................. A23l 1/14
[58] Field of Search ...................................... 99/139

[56] References Cited
UNITED STATES PATENTS 2,563,996   8/1951   Edgar ..................................... 99/139
2,852,393   9/1958   Kerr ....................................... 99/139
3,300,316   1/1967   Cooper et al. ..................... 99/139 X Primary Examiner—Alvin E. Tanenholtz
Assistant Examiner—J. M. Hunter
Attorney—Jonathan Plaut

[57] ABSTRACT

A method for preparing a fruit pudding in a two-step process. A pudding base mixture comprising water, sugar and starch is blended together into a homogeneous mix and thereafter sterilized. Separately, an edible acid-flavoring base is prepared and separately sterilized. The separately sterilized pudding base and acid-flavoring mixture are thereafter mixed together to form a fruit pudding. The pudding is aseptically canned.

5 Claims, No Drawings

PREPARATION OF A FRUIT PUDDING

BACKGROUND OF THE DISCLOSURE

The instant invention is directed to a method for preparing a fruit pudding. More specifically, the instant invention is directed to a process for preparing a fruit pudding in which a pudding base and an acid flavoring mixture are separately prepared and sterilized prior to being combined to form the fruit pudding.

Fruit puddings have customarily, in the prior art, been prepared by mixing together water, sugar, starch and edible acids. To this basic mix was added, in varying amounts, a vegetable fat or oil, salt and flavoring and coloring ingredients. The mixture, in the prior art, is stirred together and sterilized at a temperature of about 200° F. The sterilized mixture is thereafter poured into cans and allowed to cool while in the can. A more recent innovation has been the cooling of the sterilized mix prior to canning and thereafter aseptically canning the sterilized pudding.

The procedure enumerated above, although commercially employed includes certain disadvantages that increase the cost of the process as well as result in a less palatable product than should be the case. The use of starch in the mixture has as its purpose the maintenance of a suitably high viscosity of the resulting pudding. However, the effect of a heated acid on starch is to deactivate the starch's thickening property. Thus, in the prior art, when the combined mix is sterilized, the elevated temperature of the mix, in the presence of the acid ingredient results in a partial deactivation of the thickening effect of the starch on the pudding mixture. To compensate, food processors add an excess of starch to get the desired viscosity of the pudding. The cost of this additional starch adds to the cost of making the pudding. Moreover, the pudding often takes on an undesirable starchy flavoring.

An additional disadvantage in the prior art method of fruit pudding preparation is the corrosive effect on the processing equipment. This is caused by the presence of the edible acid, especially at elevated temperature. This is important in view of the relatively large size equipment required in the process of the prior art. In order to prevent corrosion, large additional costs may be incurred by employing corrosion resistant equipment. Alternatively, if no such precautions are taken, the expense of maintaining the large size equipment adds significantly to the preparation costs.

SUMMARY OF THE INVENTION

The instant invention is directed to a process which overcomes the deficiencies of the prior art method of preparing a fruit pudding. Basically, this is accomplished by separately processing and sterilizing the pudding base, that is all the constituents of the pudding except for the edible acid and flavoring. In this way, the adverse effect, on the starch, by the edible acid at elevated temperatures is removed, resulting in a more palatable product produced at a lower cost. In addition, the separate processing and sterilizing equipment used to process the edible acid flavoring mixture is smaller sized so that the cost of providing corrosion resistance for this equipment is lower, resulting in lower capital costs for the processing equipment. Also, in the event of corrosion, the replacement costs are correspondingly reduced.

In accordance with the instant invention, a process for making a fruit pudding is provided in which a base mixture comprising sugar, starch and water is blended and sterilized. A flavoring mixture comprising an edible acid, flavoring and water is separately blended and sterilized. The two separately processed mixtures are cooled and are thereafter mixed together to form a sterilized fruit pudding, which is thereafter preferably aseptically canned.

DETAILED DESCRIPTION OF THE INVENTION

A base mixture for a fruit pudding is prepared by blending sugar, starch and water together. In many applications, a vegetable fat or oil may also be added. In addition, lesser amounts of salt and coloring agents are included in the mix. The composition of the base mixture in terms of the percentage of each of the above-mentioned ingredients varies in accordance with the flavor and quality of the fruit pudding to be produced. Certain percentages for key ingredients, although not limiting in the sense that fractions outside these ranges are inoperable, are preferably within prescribed ranges. Thus the percentage of starch in the base mixture is usually in the range to produce a final fruit pudding with a starch concentration of 3 to 7.5 percent by weight. More preferably, the starch concentration ranges from 4 to 6 percent by weight. The ingredients are mixed together to form a homogeneous mixture. After mixing, the base mixture is heated to a temperature in the range of about 120° F. to 150° F. This heating step reduces the steam load in the subsequent sterilizing procedure which will be described below. The temperature of the base mixture is preferably maintained below 155° F. At a temperature greater than 155° F. the starch constituent is activated. That is, the starch granules being to swell. In this condition, the starch is more readily sheared when sterilized and tends to lose its effectiveness.

The heated base mixture is next sterilized. The sterilization step in the instant invention is preferably by steam injection. In steam injection sterilization, the base fruit pudding mixture is heated to a temperature in the range of about 250° F. to 300° F. for a period of 1 to 300 seconds by the injection of steam. More preferably, steam injection heating results in an increase in the base mixture temperature to about 280° F. for a period of 1 to 60 seconds. Although steam injection sterilization is preferred, other methods of sterilizing the base pudding mixture may be substituted.

In a preferred embodiment, the hot, sterilized base mixture is conveyed, immediately after sterilization, into a flash tank. The flash tank is provided for the dual purpose of cooling the mixture as well as removing excess water contained in the mixture. The mixture is cooled to a temperature in the range of about 130° F. to 160° F. The excess water in the original blend as well as water added due to any condensation of injected steam is herein removed.

In a separate procedure the acid flavoring mixture is prepared. The acid flavoring mixture comprises a combination of an edible acid, flavoring and water. Once again, the relative composition of the constituents varies with the type and quality of fruit pudding to be produced. Of course, the flavoring added is dependent upon the type of fruit pudding to be prepared. For example, a lemon flavoring is employed when lemon pudding is to be made. It should be appreciated that any one of many fruit puddings may be produced merely by varying the flavoring employed. In all cases the procedure to be described below is independent of the fruit flavor used. Moreover, the composition of the pudding is almost independent of the flavoring employed. In most cases, a change in the fruit flavoring employed will make necessary, at most, a small change in the percentage of the edible acid employed. In this regard, it is preferably that the percentage of edible acid in the final fruit pudding be in the range of about 0.2 to 1.0 percent by weight of the pudding. More preferably, the range of edible acid is between 0.4 to 0.5 percent by weight. In terms of the resultant pH of the pudding, the edible acid constituent should result in a pudding having a pH of below 5, and preferably 3.5 to 4.2. The acid-flavoring mixture is sterilized upon completion of the mixing of the ingredients. There is no need to preheat the acid-flavoring mixture because of its relative small volume compared to that of the base mixture. Thus, the heat load is correspondingly reduced to the point where the pre-heating step does not involve significant savings in the heat sterilization step. The acid flavoring mixture is preferably steam sterilized to a temperature in the range of about 180° F. to 200° F. for a period in the range of about 10 seconds to 300 seconds. Again, sterilization by steam injection is preferably employed.

Immediately after sterilization of the acid-flavoring mixture, the mixture is cooled. The cooling procedure, preferably by passing the hot acid flavoring mixture through a double pipe exchanger in which cold water or the like is employed as a cooling medium, results in a reduction of the temperature of acid-flavoring mixture to 70° F. or below. The temperature of the flavoring mixture may be as low as 40° F. It should be appreciated that the corrosive effect of the acid-flavoring mixture on the processing equipment is directly proportional to the temperature of the mixture. Thus, the lower the temperature, the lesser the corrosive effect of the flavoring mixture. For this reason, cooling occurs immediately after sterilization of the flavoring mixture and occurs to as great a degree as is consistent with the equipment available.

The sterilized and cooled base mixture and the cooled sterilized acid-flavoring mixture are thereafter mixed together. Preferably this mixing occurs by pumping the two stream together. This procedure is often described as inline mixing. The combined stream is thereafter cooled to a temperature below 120° F. and preferably about 80° F. The cooled fruit pudding is thereafter aseptically packaged.

The following examples are provided for illustrative purposes only and should not be construed, in any way, as limiting the scope of the instant invention, which is defined in the appended claims. It should be clear that various modifications and variations can be made to the detailed description and the examples without departing from the scope of the invention.

EXAMPLE 1

A lemon pudding base mixture is prepared by mixing together the following:
33.0 lbs of 66.5 percent sugar syrup
5.5 lbs starch
0.2 lb of salt
0.25 lb of sodium citrate
1.5 lbs vegetable oil
a trace amount of coloring
55.4 lbs of water.

The mixture is blended, stirred and thereafter preheated in a double pipe heat exchanger to a temperature of about 145° F. The heated mixture is next sterilized by injecting steam into a mixture so that the total mass is at a temperature of about 280° F. for a period of about 60 seconds. Immediately after sterilization, the mixture is conveyed into a flash tank in which the mixture is cooled to a temperature of about 145° F. and wherein the water resulting from the steam injected into the mass is removed.

In a separate processing step
0.45 lb of citric acid
0.95 lb of lemon flavoring
and 3.60 lbs of water
are mixed together. The mixed acid-flavoring aqueous mixture is heated to a temperature of about 200° F. for 30 seconds by direct steam injection. The flavoring mixture is thereafter cooled in a double pipe heat exchanger to a temperature of about 70° F.

The sterilized pudding base mixture and the sterilized acid-flavoring mixture are pumped together. The combined fruit pudding mixture is immediately thereafter cooled to a temperature of about 80° F. and aseptically packaged.

EXAMPLE 2

A pudding base of the same composition as that described in Example 1 is combined with an acid mixture of the same composition as that described in Example 1, the two together forming a single pudding mixture which is sterilized at a temperature of about 180° F. The sterilized mixture is thereafter cooled and aseptically canned. Unlike the results in Example 1, wherein the viscosity was of a suitable texture, the viscosity in this case was low so that the pudding flowed as a liquid. The desired viscosity of 125,000 centipoises at a temperature of 72° F. after a 48 hour set is not attained in this second example. This viscosity criteria is attained in Example 1.

EXAMPLE 3

The same procedure followed in Example 2 is followed in this example. However, the starch constituent is increased so that the total starch represents 6.9 percent of the total pudding mixture. The resultant lemon pudding has an improved viscosity over the pudding described in Example 2. However, the viscosity after 48 hours was still less than one half of the 125,000 centipoise reading obtained when the pudding was processed as in Example 1.

EXAMPLE 4

A strawberry pudding base mixture is prepared in accordance with the procedure enumerated in Example 1, except that the acid-flavoring mixture comprises:
0.40 lb of citric acid
3.50 lbs of strawberry puree, and
0.10 lb of strawberry flavor.

The resulting strawberry pudding has an acceptable viscosity of about 125,000 centipoise at a temperature of 72° F. after a 48-hour set.

What is claimed is:
1. A process for producing a sterile fruit pudding comprising the steps of:

combining together a pudding base mixture comprising sugar, starch and water, wherein said starch is in an amount sufficient to provide 3 to 7.5 per cent by weight of starch in the fruit pre-heating said base mixture to a temperature in the range of about 120° F to 150° F;

heat sterilizing said pre-heated base mixture;

separately blending an acid-flavoring mixture comprising an edible acid, flavoring ingredients and water, wherein said acid is in an amount sufficient to provide about 0.2 to 1.0 per cent by weight acid in the fruit pudding;

heat sterilizing said acid-flavoring mixture;

combining said base mixture and said acid-flavoring mixture together into a sterile, fruit flavored pudding; and aseptically canning said fruit pudding.

2. A process in accordance with claim 1 wherein said heat sterilization of said base mixture comprises steam injection into said mixture so that said mixture attains a temperature in the range of about 250° F to 300° F for a period of about 1 to 300 seconds.

3. A process in accordance with claim 1 wherein said heat sterilization of said acid-flavoring mixture comprises steam injection into said mixture so that said mixture reaches a temperature in the range of about 180° F to 200° F for a period of about 10 to 300 seconds.

4. A process in accordance with claim 1 wherein said base mixture and said flavoring are each separately cooled after sterilization of each of said mixtures.

5. A process in accordance with claim 3 wherein said sterilized and cooled base and flavoring mixtures are combined together by in line mixing of the two mixtures.

* * * * *